UNITED STATES PATENT OFFICE.

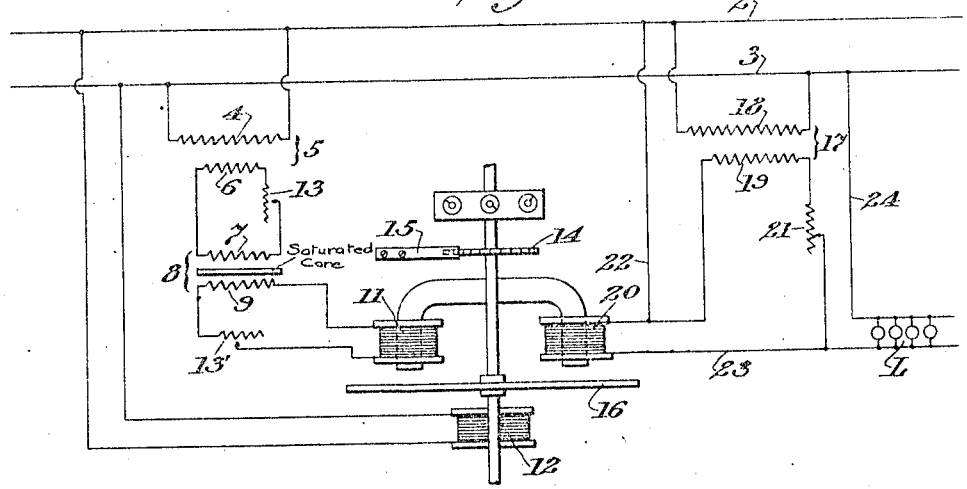
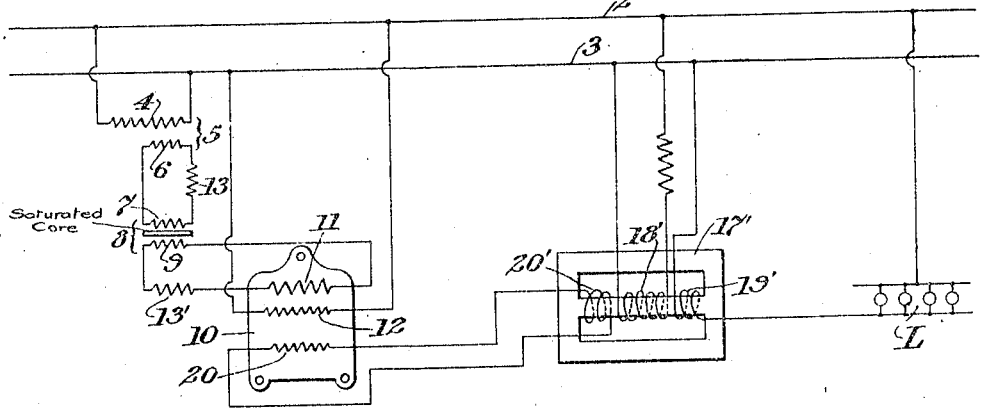
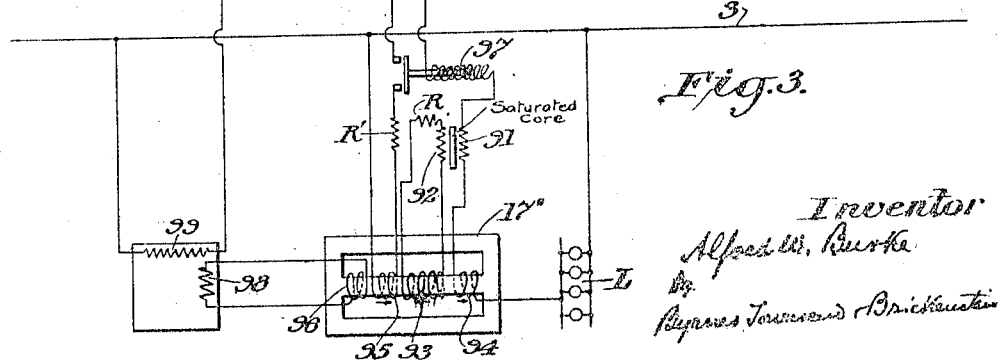

ALFRED W. BURKE, OF WYNNEWOOD, PENNSYLVANIA.

EXCESS-DEMAND METER.

1,308,656.     Specification of Letters Patent.     Patented July 1, 1919.

Application filed December 16, 1918. Serial No. 267,013.

*To all whom it may concern:*

Be it known that I, ALFRED W. BURKE, a subject of the King of Great Britain, residing at Wynnewood, in the county of Montgomery and State of Pennsylvania, have invented certain new and useful Improvements in Excess-Demand Meters, of which the following is a specification.

This invention relates to recording wattmeters, such as are used on alternating current circuits for recording the electrical energy consumed in excess of a certain predetermined quantity.

The object of my invention is to produce a meter that will record only the excess energy over a predetermined quantity and that is substantially unaffected in accuracy by variations in voltage or power factor of the load in the supply circuit.

This result is accomplished by the use of a specially designed transformer, called a compensator, the magnetic circuit of which is normally operated at a flux density above its magnetic saturation point. The secondary current from the compensator is therefore substantially constant regardless of changes in the primary current above a certain minimum. This secondary current is used to produce a constant negative torque on a rotatable member, such as the armature, of the meter which, however, is preferably prevented from reverse rotation as described hereafter.

Means are also provided for exerting a positive torque on the rotatable member of the meter, this positive torque balancing the negative torque when the predetermined amount of energy is consumed and upon the use of energy in excess of the predetermined demand overbalancing the negative torque and causing the meter to record the excess.

My invention also provides means by which the current for producing this positive torque is made up of two components, one substantially in phase with the voltage on the line circuit, and the other substantially in phase with the load, so that the registration of the meter is accurate not only for variations in voltage, but also for variations in the power factor of the supply circuit.

In the drawings,—

Figure 1 is a diagrammatic representation of the preferred method of carrying out my invention;

Fig. 2 is a diagrammatic representation of a modified form;

Fig. 3 is a diagrammatic representation of another modification.

Referring to Fig. 1 of the drawings, the alternating current mains, 2, 3, are shown, as connected to the load L through an excess-demand meter, comprising a high resistance potential coil 12, and two current coils 11 and 20 mounted upon a U-shaped magnetic core. The windings on the coils 11 and 20 are so connected that the instantaneous magnetizing effects are opposite. The windings on the coils 11 and 12 coöperate to produce a magnetic field tending to rotate the armature 16 backward, while those on coils 20 and 12 tend to rotate the armature forward. The current for the coil 11 is furnished from the secondary 9 of a transformer 8 having a saturated core. The primary 7 of this transformer receives current from the secondary of a step-down transformer 5, whose primary 4 is connected across the supply mains. 13 and 13' are adjustable resistances. For clearness sake the transformers 5 and 8 have been shown as separate. They may of course be combined into one.

The current flowing through coil 20 is made up of two components, (1) current flowing through circuit formed by wires 22, 23, the load L, and wire 24; and (2) current flowing from the secondary 19 of step-down transformer 17, whose primary 18 is connected across the line, 21 being a variable resistance.

The first component varies with the load and the second with the voltage. Each component is so proportioned that at normal voltage and no current in the load L, the shifting magnetic field produced by windings 12 and 20 produces a forward torque corresponding to the customer's demand, so that the combined effect of the two components at demand load is to produce a normal forward torque corresponding to twice the customer's demand.

The current supplied to winding 11 is such that the torque produced by windings 11 and 12 is negative, *i. e.* tends to rotate the meter armature backward and is equal to the combined normal forward torque of both the forward components above referred to, i. e. this backward torque is twice the torque produced by either forward component.

The current delivered to winding 11 is substantially constant because the core of transformer 8 is so designed as to be magnetically saturated at any voltage liable to occur in use. The armature shaft may be prevented from backward movement by a ratchet 14 and pawl 15, or any other suitable intermittent clutch device.

With the meter thus arranged it will be apparent that at normal voltage and no load, the meter will tend to rotate backward under a torque corresponding to the normal demand. As the load comes on, this backward torque will be diminished because of current flowing through coil 20 and the load, until the demand current has been reached, when the two torques will be balanced. Upon use of current in excess of the demand, the forward torque will prevail and such excess energy will be recorded by the meter. If, however, the voltage increases, the current to winding 20 from transformer 17 will increase in direct proportion as also that in high resistance potential winding 12, with the result that the effect of the load current on winding 20 will cause a torque balance to be reached before the normal demand load current is reached, the watt-meter, however, beginning to record the excess energy in watts as soon as the normal demand in watts is exceeded. The increase in current from secondary 19 to coil 20, due to the voltage increase, just compensates in effect on the demand for the effect of the increase in strength of potential winding 12, the result being that the demand is not affected by the change in voltage.

Similarly, if the voltage on the line decreases, the current component due to transformer 17 will decrease and the negative torque will not be balanced until the load-current component has a current value above the normal current-demand at normal voltage. But, in this case also, the watt-meter will begin to record as soon as there is used any power, expressed in watts, above the demand rate.

It is evident that by the arrangement described the meter operates to record excess power only when the demand as expressed in watts is exceeded. The torques acting in the meter disk may be analyzed as follows: The negative torque is a function of the constant current in the coil 11 and of the current in the coil 12 varying with the voltage. The forward torque is a function of the currents flowing in coils 20 and 12, the current in the coil 20 varying with the load and with the voltage. The current in the voltage coil 12 and that current component in the coil 20 which is a function of the load current co-operate in the usual way to produce the forward torque. The current component due to the transformer 19 varies with the voltage and offsets the variation of the negative torque due to fluctuations of the current in coil 12. Normally i. e. at normal voltage the effect of the current due to transformer 19 just balances the effect of one half of the current flowing through coil 11. As the line voltage varies the current component due to transformer 19 varies and the increase or decrease of current just compensates for the increase or decrease of current in coil 12. In this manner the positive torque due to the coöperation of coil 12 and the component in coil 20 which is a function of the load current is modified to compensate accurately for the variations of the negative torque with the result that the positive or forward torque is strictly proportional to the rate of power used in excess of the demand expressed in watts.

It will further be apparent that the current flowing through winding 20 is the vector sum of the current induced by the shunt transformer 17, which current is a function of the line voltage, and the current in the load circuit itself. If the line current lags behind the line voltage, i. e. if the power factor is less than 1, the torque produced by the coöperation of coils 20 and 12 decreases to that extent. The watt-meter therefore registers true watts and not volt-amperes. As long as a constant current from the transformer 8 with the saturated core passes through a separate coil, such as 11, the meter will register the excess power correctly, regardless of the power factor of the load.

Only one element of a polyphase meter need be thus equipped to give the required negative torque, and the other element can be of the standard form and will furnish the positive torque proportional to the current and voltage.

While I have shown diagrammatically a particular form of induction meter, it will be understood that the invention is applicable to other types of electric energy meters.

A modified form of arrangement for producing a similar result is shown in Fig. 2, in which a different method of supplying current to the meter current coil is shown. In this figure, 17' is a transformer comprising a primary shunt coil 18', a primary load coil 19', and a secondary coil 20'. The shunt coil 18' is connected across the lines 2, 3, and the current flowing through it is therefore proportional to and varies with the line voltage. The coil 19' is connected in series with the load L and the current flowing through it is the load current. The instantaneous values of the current induced in the secondary 20' are thus a function of the vector sums of the load current and line voltage.

The secondary 20' is connected to the current coil 20 in the watt-meter 10, this current coil 20 being, as before-described, so connected to the secondary 20' that it produces with the potential coil 12 a positive torque, i. e. turns the meter disk forwardly.

The transformer secondary 9 and current coil 11 are so designed that the current coil 11 produces in conjunction with the voltage coil 12 at normal voltage a negative torque proportional to twice the demand.

Coils 18', 19', 20' and 20 are so designed that the current induced in secondary 20' by the shunt coil 18', at normal line voltage, produces a positive torque, through the coöperation of coils 12 and 20, which corresponds to the demand for which the meter is set, and that the current induced in secondary 20 by the load coil 19', at normal load current likewise produces a positive torque, through the coöperation of coils 20 and 12, of the same value.

At no load and normal voltage the negative torque produced by the current coil 11 and potential coil 12 will correspond to twice the demand, while the positive torque produced by the current coil 20 and potential coil 12 will correspond exactly to the predetermined demand i. e. one half of the negative torque.

As the load comes on and the current passing through the load coil 19' increases to the normal load current, the positive torque produced by this current through coil 20 and coil 12, will also equal one half of the negative torque.

Under these circumstances the negative torque is exactly balanced by the total positive torque produced by the currents which are induced by the shunt coil 18' and the load coil 19', and flow through current coil 20.

All energy consumed in excess of the demand, be it due to increase of the load current or line voltage or both, causes an increase of the positive torque in excess of the negative torque and this excess of positive torque is substantially proportional to the excess consumption of energy.

If for instance the line voltage rises, the shunt coil 18' supplies more current and the positive torque due to coils 12 and 20 increases in proportion. A less amount of line current is required to balance the negative torque and as soon as this value is exceeded, the meter begins to register.

Conversely, if the voltage drops, the current flowing through the shunt coil 18' is less, and the positive torque due to this current decreases in proportion. Not until the line current has risen above the normal would the negative torque be balanced, and only current in excess of that value would cause the meter to register. In either case the meter will begin to register only when the actual demand in watts is exceeded.

In Fig. 3 is illustrated still another modification in which the saturated core transformer is connected in series with the load. The watt-meter has the usual potential coil 99 and current coil 98 (two opposed current coils may be used as shown in Fig. 1). The transformer 17" has a secondary winding 96, and three primary windings 93, 94 and 95. The winding 94 is in series with the load L, a relay 97, and the primary 91 of a saturated core transformer. The secondary 92 of this transformer is connected through an adjustable resistance R to winding 93. The winding 95 is connected through adjustable resistance R' across the line, and its circuit is arranged to be interrupted by a switch controlled by relay 97. At normal voltage and normal demand, the windings 94 and 95 have the same number of ampere turns, while the winding 93 has twice that number of ampere turns, the core of the transformer being so constructed as to be saturated at or below the normal load current. The winding 93 is wound to produce a current of such direction as to produce a negative torque in the meter, while coils 94 and 95 are wound to produce a positive torque. The operation of this form of the device will be readily understood from the foregoing description.

At normal load and voltage, no current will be produced in the secondary 96 as the magnetic effects of winding 93 will be balanced by those of windings 94 and 95. Upon increase of voltage, the effect of winding 95 will be increased and the meter will begin to register at a rate of current flow less than normal. If the voltage decreases, the lessened amount of positive torque from winding 95 will permit a larger than normal current quantity of current to flow through winding 94 before the fixed wattage demand point is reached. The true excess watts used will be recorded on account of these variations. The relay 97 is so adjusted as to open the circuit of winding 95 before the load current falls below a point where the magnetic effect of winding 93 would be smaller than the combined effect of windings 94 and 95.

I claim:

1. In an instrument for measuring electrical energy consumed in excess of a predetermined fixed rate, the combination of a movable element, means for producing thereon a positive torque which is a function of the rate of energy consumption, and means operative to produce thereon a substantially constant negative torque, the latter means comprising means for producing a negative torque which is variable as a function of the line voltage, and means for producing a positive torque variable as a function of the line voltage, said two latter torques being so related to each other as to produce in conjunction a constant negative torque.

2. In an instrument for measuring electric energy, a voltage coil, a current coil and means for passing a substantially constant current therethrough, another current coil, means for passing a current therethrough which is a function of the line voltage, means for passing a current therethrough which is a function of the load current, said current coils being so arranged that they produce in conjunction with the voltage coil torques in opposite directions and that the resultant torque equals zero when the rate of energy consumption represents a fixed demand, and that the positive torques will prevail when the energy consumed is in excess of the demand.

3. In an instrument for measuring electric energy, a voltage coil, a current coil, a constant current transformer connected to said current coil, another current coil, transformer means for passing a current therethrough which is a function of the line voltage, means for passing a current therethrough which is a function of the load current, said current coils being so arranged that they produce torques in opposite directions and that the resultant torque equals zero when the rate of energy consumption represents a fixed demand, and that the positive torques will prevail when the energy consumed is in excess of the demand.

4. In an instrument for measuring electric energy in excess of a certain demand comprising a movable element, means for producing a substantially constant negative torque proportional to twice the demand, means responsive to the line voltage for producing a positive torque which is substantially proportional to the demand when the line voltage is normal and means responsive to the load current for producing a positive torque substantially proportional to the load current.

5. In an instrument for measuring electric energy in excess of a certain demand comprising a movable element, a voltage coil and two current coils, means for passing a constant current through one of said current coils and means for passing a current through the second current coil which is a function of the vector sum of the load current and the line voltage, the said means and current coils being so constructed and arranged that the torques produced thereby oppose each other and that the resultant torque equals zero when the rate of energy consumption represents the demand.

6. In an instrument for measuring electric energy in excess of a certain demand comprising a movable element, a voltage coil and two current coils, a constant current transformer having its secondary connected to one of the said current coils, another transformer having a primary connected across the line, and its secondary connected to the other current coil which is in series with the load, the transformers and current coils being so constructed and arranged that the torques produced by the current coils in conjunction with the voltage coil oppose each other and that the resultant torque equals zero when the line voltage and line current represent the demand, and that the positive torques will prevail when the energy consumed is in excess of the demand.

7. In an instrument for measuring electric energy in excess of a certain demand comprising a movable element, a voltage coil and two current coils, means for passing a constant current through one of said current coils to produce in conjunction with the voltage coil a substantially constant negative torque, proportional to the normal demand in watthours, means for passing through the second current coil a current having two components, one component being a function of the load current and the other component a function of the line voltage, the arrangement being such that the component due to the line voltage produces in conjunction with the voltage coil at normal voltage a positive torque proportional to the normal demand and the other component produces in conjunction with the line voltage a positive torque proportional to the rate of energy consumption.

8. In an instrument for measuring electric energy in excess of a certain demand comprising a movable element, a voltage coil and two current coils, means comprising a saturated core transformer, for passing a constant current through one of said current coils, means for supplying current to the other current coil comprising (1) a direct connection in series with the load, and (2) a transformer having its primary connected across the line, and its secondary connected to said other current coil, the transformers and current coils being so constructed and arranged that the torque produced by the current coils in conjunction with the voltage coil oppose each other, that the resultant torque on the movable member equals zero when the line voltage and load current represent a fixed demand, and that the positive torques will prevail when the energy consumed is in excess of the fixed demand.

In testimony whereof, I affix my signature.

ALFRED W. BURKE.